United States Patent
Suh et al.

(10) Patent No.: US 9,992,000 B2
(45) Date of Patent: Jun. 5, 2018

(54) SYSTEM AND METHOD FOR DUPLICATING PREAMBLE INFORMATION

(71) Applicant: Huawei Technologies Co., Ltd., Shenzhen (CN)

(72) Inventors: Jung Hoon Suh, Kanata (CA); Yan Xin, Kanata (CA); Osama Aboul-Magd, Kanata (CA); Sheng Sun, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 23 days.

(21) Appl. No.: 15/010,717

(22) Filed: Jan. 29, 2016

(65) Prior Publication Data

US 2016/0301500 A1 Oct. 13, 2016

Related U.S. Application Data

(60) Provisional application No. 62/145,765, filed on Apr. 10, 2015.

(51) Int. Cl.
*H04L 5/00* (2006.01)
*H04L 27/26* (2006.01)

(52) U.S. Cl.
CPC .......... *H04L 5/005* (2013.01); *H04L 27/2613* (2013.01)

(58) Field of Classification Search
CPC ............................. H04L 5/005; H04L 27/2613
See application file for complete search history.

(56) References Cited

U.S. PATENT DOCUMENTS

| 2004/0120434 A1* | 6/2004 | Chang | H04L 1/0003 |
| | | | 375/350 |
| 2012/0207242 A1* | 8/2012 | Maltsev | H04L 27/2608 |
| | | | 375/295 |
| 2014/0325304 A1* | 10/2014 | Murakami | H03M 13/118 |
| | | | 714/752 |
| 2016/0156750 A1* | 6/2016 | Zhang | H04L 69/22 |
| | | | 370/338 |

(Continued)

FOREIGN PATENT DOCUMENTS

| CN | 1902875 A | 1/2007 |
| CN | 104081670 A | 10/2014 |

(Continued)

OTHER PUBLICATIONS

"SIG Field Design Principle for 11 ax"; Kwon et al; Mar. 9, 2015; IEEE 802.11-15/0344r2.*

(Continued)

*Primary Examiner* — Benjamin H Elliot, IV

(57) ABSTRACT

An aspect of the disclosure provides a wireless frame transmission method. Such a method includes duplicating a preamble in the frequency domain to form at least one duplicate preamble, each preamble having multiple fields. The method further includes puncturing at least one of the preamble fields in the preamble with a first puncturing pattern and puncturing corresponding preamble fields in the at least one duplicate preamble with at least one additional puncturing pattern. The method further includes transmitting a frame including the preamble, the at least one duplicate preamble and a payload. In some embodiments the preamble and the duplicate preambles are each at different frequencies.

19 Claims, 11 Drawing Sheets

(56) References Cited

U.S. PATENT DOCUMENTS

| | | | |
|---|---|---|---|
| 2016/0204912 A1* | 7/2016 | Sun | H04L 27/2613 375/302 |
| 2016/0255610 A1* | 9/2016 | Li | H04B 7/0413 370/329 |
| 2016/0269047 A1* | 9/2016 | Jiang | H03M 13/27 |

FOREIGN PATENT DOCUMENTS

| | | |
|---|---|---|
| KR | 20050119053 A | 12/2005 |
| WO | 2009131162 A1 | 10/2009 |

OTHER PUBLICATIONS

"OFDMA Numerology and Structure"; Azizi et al; Mar. 9, 2015; IEEE 802.11-15/0330r1.*
"Application of puncturing of a CRC code for WLANs"; Ghosh et al; Vehicular Technology Conference (VTC Fall), 2013 IEEE 78th; Sep. 2-5, 2013.*
"Preamble structure for 11 ax system"; Zhang et al; Jan. 2015; IEEE 802.11-15/0101r1.*
Abstract of US2012207242 (A1) corresponding to CN1902875 (A).
English abstract of KR20050119053 A.
Partial English translation of KR20050119053.
Abstract of US2013198593 (A1) corresponding to CN104081670 (A).
International Search Report for International Application No. PCT/CN2016/073763 dated May 13, 2016.

* cited by examiner

| 40 MHz Band | 20 MHz Band | L-Preamble 510 | HE-SIGA 520 | HE-SIGB common – a with MCS2 530 | HE-SIGB dedicated – a with MCS2 540 | HE-Preamble and Payload 590 |
|---|---|---|---|---|---|---|
| 1 | 1 | L-Preamble 510 | HE-SIGA 520 | HE-SIGB common – a with MCS2 530 | HE-SIGB dedicated – a with MCS2 540 | |
| | 2 | L-Preamble 510 | HE-SIGA 520 | HE-SIGB common – a with MCS2 532 | HE-SIGB dedicated – a with MCS2 542 | |
| 2 | 3 | L-Preamble 510 | HE-SIGA 520 | HE-SIGB common – a with MCS2 – A 534 | HE-SIGB dedicated – a With MCS2 – A 544 | |
| | 4 | L-Preamble 510 | HE-SIGA 520 | HE-SIGB common – b with MCS2 – A 536 | HE-SIGB dedicated – b With MCS2 – A 546 | |

FIG.5

| 40 MHz Band | 20 MHz Band | | | |
|---|---|---|---|---|
| 1 | 1 | L-Preamble 610 | HE-SIGA 620 | HE-SIGB common with MCS2 630 | HE-SIGB dedicated – a With MCS3 640 |
| | 2 | L-Preamble 611 | HE-SIGA 622 | HE-SIGB common with MCS2-A 632 | HE-SIGB dedicated – a With MCS3 642 |
| 2 | 3 | L-Preamble 610 | HE-SIGA 620 | HE-SIGB common with MCS2-B 634 | HE-SIGB dedicated – a MCS2 – A 644 |
| | 4 | L-Preamble 611 | HE-SIGA 622 | HE-SIGB common with MCS2 636 | HE-SIGB dedicated – b With MCS2 – A 646 |

HE-Preamble and Payload 690

FIG.6

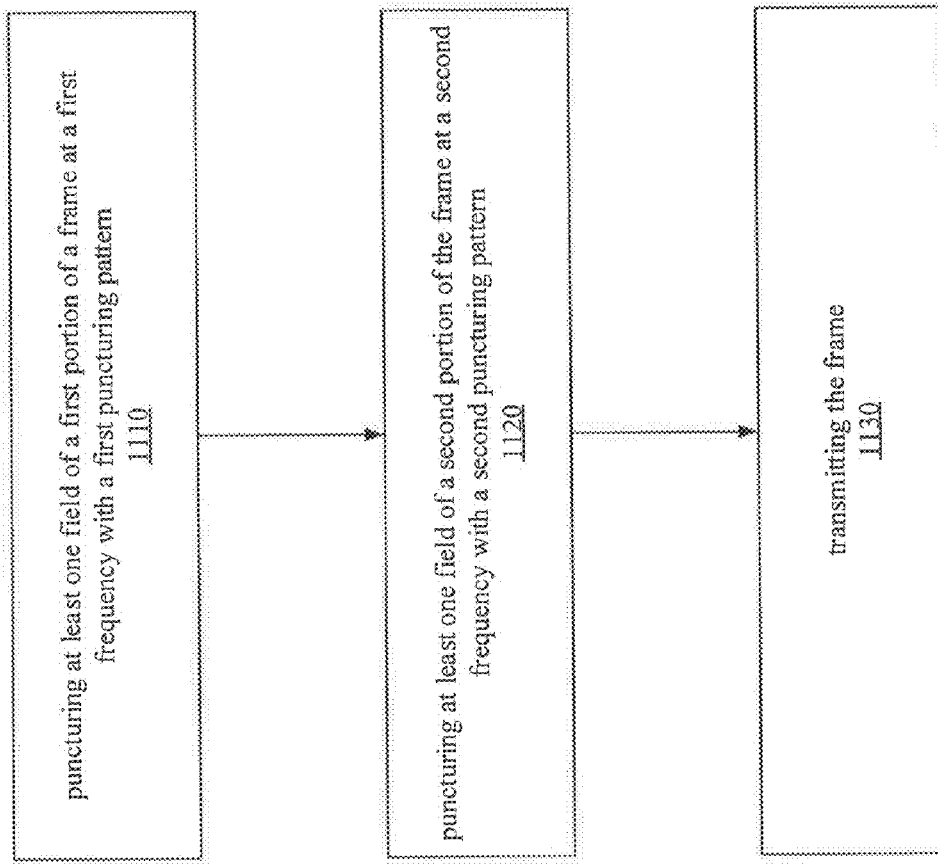

SYSTEM AND METHOD FOR DUPLICATING PREAMBLE INFORMATION

CROSS REFERENCE TO RELATED APPLICATIONS

This application claims the benefit of priority to U.S. Patent Application Ser. No. 62/145,765 entitled "System and Method for Duplicating Preamble Information" filed Apr. 10, 2015, which is hereby incorporated by reference in its entirety.

TECHNICAL FIELD

This invention relates to wireless transmission systems and methods, and more particularly to systems and methods for transmitting preamble/preamble information in wireless data frames.

BACKGROUND

Institute of Electrical and Electronics Engineers (IEEE) standards publications 802.11 outline protocols for implementing wireless local area networks (WLAN), and set forth a physical (PHY) layer frame format that includes a preamble portion carrying control data and a payload portion carrying data. The preamble portion may include a variety of preamble fields, including a legacy short training field (LSTF), a legacy long training field (LLTF), and a legacy signal (LSIG) field. There have been various extensions to the 802.11 standards, for example 802.11 ax, for providing a High Efficiency (HE) WLAN. It is desirable for systems with more advanced features (e.g., higher throughput, outdoor channels and multiple streams) to be backwards compatible with legacy nodes which follow older versions of the standards. HE preambles typically include two fields of Signal (SIG) data: HE-SIGA and HE-SIGB. Further, multiple modulation and coding schemes (MCS) are known.

SUMMARY

An aspect of the disclosure provides a wireless frame transmission method. Such a method includes duplicating a preamble in the frequency domain to form at least one duplicate preamble, each preamble having multiple fields. The method further includes puncturing at least one of the preamble fields in the preamble with a first puncturing pattern and puncturing corresponding preamble fields in the at least one duplicate preamble with at least one additional puncturing pattern. The method further includes transmitting a frame including the preamble, the at least one duplicate preamble and a payload. In some embodiments the preamble and the duplicate preambles are each at different frequencies. In some embodiments the sum of the frequency bands of the preamble and the duplicate preambles is greater than or equal to the frequency band of the payload.

Other aspects include corresponding receive steps, as well as transmitters and receivers which can be included in Access Points and other wireless devices for implementing these methods.

An aspect of the disclosure provides for a communication method. The communication method includes puncturing at least one field of a first portion of a frame at a first frequency with a first puncturing pattern. The communication method further includes puncturing at least one field of a second portion of the frame at a second frequency with a second puncturing pattern and transmitting the frame. In some embodiments the communication method further includes frequency domain duplication of at least a portion of a frame to form the first portion at the first frequency and the second portion at the second frequency. In some embodiments the frame includes a preamble and a payload, wherein frequency domain duplication includes frequency domain duplication of a preamble portion to form a first preamble portion at the first frequency and a second preamble portion at the second frequency. In some embodiments puncturing at least one field of a first portion includes puncturing at least one field of the first preamble portion with the first puncturing pattern, and puncturing at least one field of a second portion comprises puncturing at least one field of the second preamble portion with the second puncturing pattern. In some embodiments puncturing at least one field of a second portion of the frame includes puncturing at least one field corresponding to the at least one field punctured with the first puncturing pattern. In some embodiments the first puncturing pattern and the second puncturing pattern offset which bits are punctured by one bit. In some embodiments the payload occupies an 80 MHz frequency band, the first preamble portion occupies a first 40 MHz frequency band and comprises first and second bands each occupying a 20 MHz frequency band and each comprising preamble fields. In some embodiments frequency domain duplication comprises frequency domain duplication of the first preamble portion to form the second preamble portion which occupies a second 40 MHz frequency and having third and fourth bands each occupying 20 MHz and each comprising preamble fields. In some embodiments puncturing at least one field of a first portion can include puncturing at least one field of each of the first and second bands with the first puncturing pattern, and puncturing at least one field of a second portion can include puncturing at least one field of each of the third and fourth bands with the second puncturing pattern. In some embodiments each 20 MHz band includes preamble fields which are in common and are not punctured, a common field which requires puncturing and a dedicated field which requires puncturing. In some embodiments, puncturing at least one field of a first portion can include puncturing the dedicated field of each of the first and second bands with the first puncturing pattern, and puncturing at least one field of a second portion can include puncturing the dedicated field of each of the third and fourth bands with the second puncturing pattern. In some embodiments the communication method can further include puncturing the common field which includes puncturing of the first 20 MHz band with the first puncturing pattern, puncturing of the second 20 MHz band with the second puncturing pattern, and puncturing of the third 20 MHz band with a third puncturing pattern. In some embodiments the preamble fields to be punctured are BCC (Bitwise Convolutional Code) encoded using a 3/4 rate with puncturing to form bit punctured fields. In some embodiments puncturing the common field includes puncturing of the fourth band with a puncturing pattern selected from one of the first, second and third puncturing patterns. In some embodiments each of the first, second and third puncturing patterns comprise puncturing every 3rd BCC encoded bit, the second puncturing pattern offsetting the first bit to be punctured by one bit from a first bit punctured by the first puncturing pattern, and the third puncturing pattern offsetting the first bit to be punctured by two bits from the first bit punctured by the first puncturing pattern. In some embodiments the frame is an IEEE 802.11 frame, the common field is an HE-SIGB common field, the dedicated field is a HE-SIGB dedicated field, and the first puncturing pattern is an MCS2 puncturing pattern.

In some embodiments the frequency domain duplication further includes frequency domain duplication of the preamble portion to form a third preamble portion at a third frequency and a fourth preamble portion at a fourth frequency, and the method further includes puncturing at least one field of a third preamble portion with a third puncturing pattern, and puncturing at least one field of a fourth preamble portion with a puncturing pattern selected from one of the first, second and third puncturing patterns. In some embodiments each preamble includes at least one legacy field, a High Efficiency (HE)-SIGA field and at least one HE-SIGB field, and the at least one field of each preamble portion which is punctured comprises the at least one HE-SIGB field. In some embodiments the payload occupies 80 MHz and the preamble portion occupies 20 MHz such that said frame includes the payload, a 20 MHz preamble, and 3 duplicate 20 MHz preamble portions each including the same at least one legacy field and the HE-SIGA field. In some embodiments the HE-SIGB fields are BCC (Bitwise Convolutional Code) encoded using a 3/4 rate with puncturing to form bit HE-SIGB fields. In some embodiments each of the first, second and third puncturing patterns comprise puncturing every 3rd BCC encoded bit. In some embodiments the second puncturing pattern offsetting the first bit to be punctured by one bit from a first bit punctured by the first puncturing pattern; and the third puncturing pattern offsetting the first bit to be punctured by two bits from the first bit punctured by the first puncturing pattern. In some embodiments a receiver which receives the transmitted frame inserts zero bit data into each of the received bit punctured HE-SIGB fields according to the puncturing pattern used to puncture each HIE-SIGB field prior to the receiver conducting BCC decoding of each received HE-SIGB field.

Another aspect of the disclosure provides a transmitter for transmitting a wireless frame. Such a transmitter includes a framer for producing a frame including a preamble data and a radio unit for transmitting the frame. Such a framer includes a frequency domain duplicator for duplicating of at least a portion of a frame to form a first preamble portion at a first frequency and a second preamble portion at a second frequency. Such a framer further includes an encoder for encoding and puncturing at least one preamble field of the first preamble portion with a first puncturing pattern, and encoding and puncturing at least one preamble field of the second preamble portion with a second puncturing pattern. In some embodiments the transmitter also includes a processor and machine readable memory including executable instructions for implementing said framer. In some embodiments the machine readable code includes executable instructions for implementing the methods discussed herein.

Another aspect of the disclosure provides for a receiver. The receiver includes a radio unit for receiving a wireless frame including a first preamble portion at a first frequency and a second preamble portion at a second frequency each preamble portion including at least one field of bit punctured BCC (Bitwise Convolutional Code) encoded data. The receiver further includes a decoder for inserting zero bit data into each of the received bit punctured fields according to a first puncturing pattern for the first preamble portion and a second puncturing pattern for the second preamble portion prior to conducting BCC decoding of each received punctured field. In some embodiments the receiver further includes a processor and machine readable memory including executable instructions for implementing said decoder. In some embodiments the machine readable code includes executable instructions for implementing the methods discussed herein.

The foregoing and other objects, features, aspects and advantages of the present invention will become more apparent from the following detailed description, taken in conjunction with the accompanying drawings, of exemplary embodiments of the invention, which description is by way of example only.

BRIEF DESCRIPTION OF DRAWINGS

FIG. 5 illustrates a frame according to an embodiment including two duplicated 40 MHz preamble portions.

FIG. 6 illustrates a frame according to another embodiment including two duplicated 40 MHz preamble portions.

FIG. 11 is a flowchart illustrating a communication method according to an embodiment.

DESCRIPTION OF EXEMPLARY EMBODIMENTS

The structure, manufacture and use of example embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Embodiments will be discussed for large band transmission (larger than 20 MHz transmission), with the duplication of primary 20 MHz SIGB information (and other preamble information) over the entire band. More specifically, example embodiments will be discussed for an 80 MHz transmission, with four duplicated 20 MHz preambles. However, embodiments are not limited to 80 MHz transmission, and can be applied to other large band transmissions (for example 160 MHz transmissions).

It is known to utilize puncturing to increase spectral efficiency while packing more data within a given bandwidth. Puncturing in conjunction with Bitwise Convolutional Codes (BCC) encoding can provide redundancy and acceptable BER for high code rates (greater than 1/2). The 802.11 Specification specifies puncturing (and a specific puncturing pattern) for MCS2 encoding. Accordingly, example embodiments will be discussed using MCS2 encoding, which utilizes 3/4 code rate Bitwise Convolutional Codes (BCC) as defined in the 802.11 Specification. However other MCS encoding schemes with a code rate greater than 1/2 could be used, e.g. 2/3.

Figure 1:
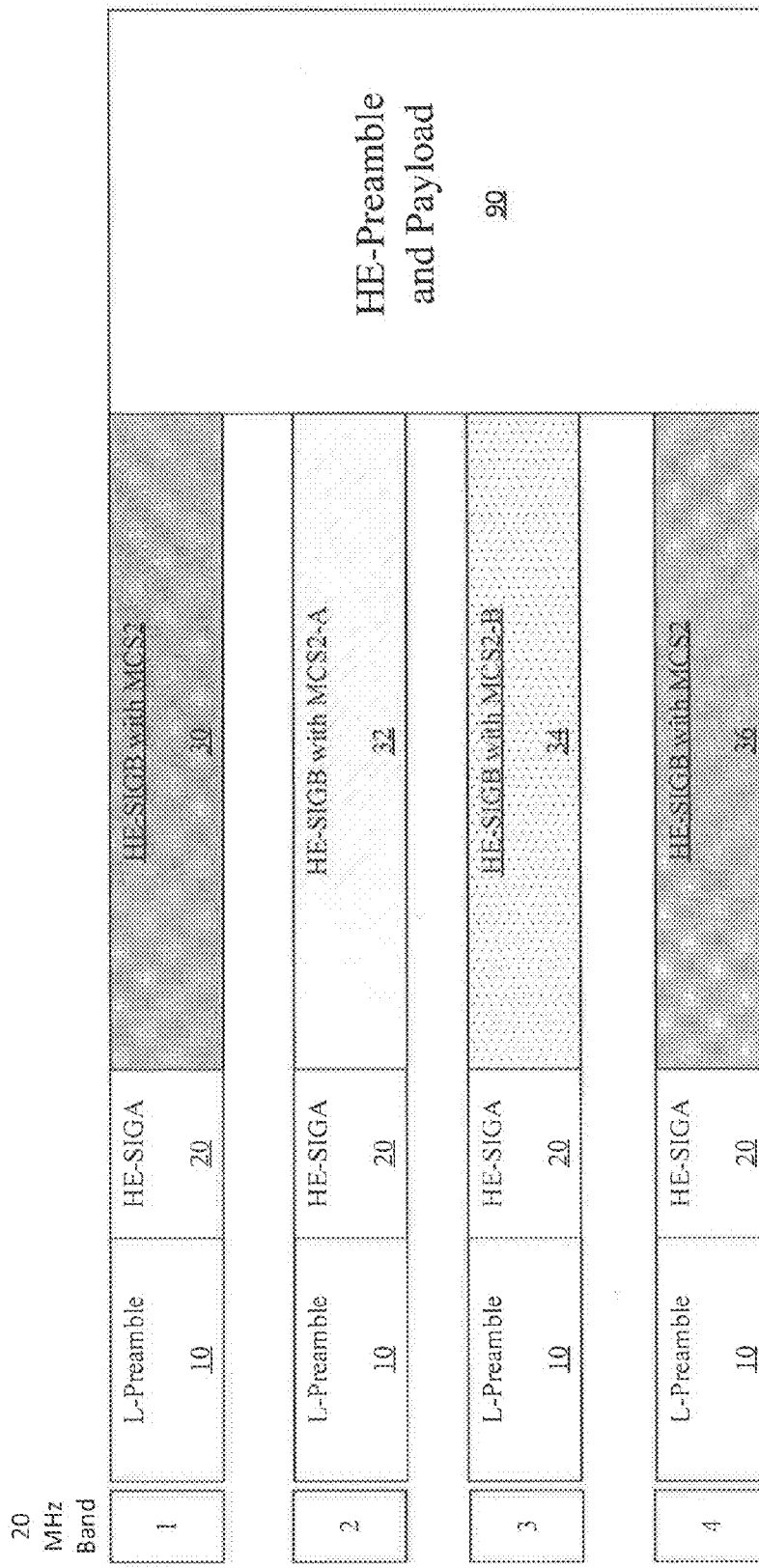
FIG. 1 illustrates a frame according to an embodiment including four duplicated preamble portions for a single HE preamble and payload portion.

FIG. 1 illustrates a frame according to an embodiment including four duplicated preamble portions for a single HE preamble and payload portion. In this example, the preamble is frequency domain duplicated across each 20 MHz band, such that there is one primary preamble (frequency band 1) and 3 duplicates (frequency bands 2, 3 and 4) shown for an 80 MHz payload. The duplicated preambles add redundancy. Accordingly each preamble is shown to have a legacy (L-preamble) field 10, which includes legacy fields required for backwards compatibility (e.g., LSTF, LLTF and LSIG), an HE-SIGA field 20 and one or more HE-SIGB fields. The top preamble is the primary preamble, and the additional preambles are duplicates. The HE-SIGB field of each preamble is BCC encoded and punctured. The HE-SIGB field 30 of the primary preamble is punctured with a first puncturing pattern, which in this example is the known MCS2 puncturing pattern. However, different puncturing patterns are utilized for the duplicated HE-SIGB fields. While the present example shows puncturing of the HE-SIGB field, it is contemplated that similar principles could be applied to other preamble fields. The designations MCS2-A and MCS2-B indicate these different puncturing patterns, which will be explained further with reference to FIGS. 2 and 3. The HE-SIGB field 32 of the second preamble is punctured with a second puncturing pattern, which in this example is designated as MCS2-A. The HE-SIGB field 34 of the third preamble is punctured with a third puncturing pattern, which in this example is designated as MCS2-B. The HE-SIGB field 36 of the bottom preamble field is shown to have the same puncturing pattern (MCS2) as the primary preamble, because only three distinct puncturing patterns are shown. However, it should be appreciated that either MCS2-A or MCS2-B could be re-used for the bottom preamble instead, or an alternate puncturing pattern could be used. It should be noted that in order to focus our discussion on the portions of the frame which are significant for puncturing, not all the fields in a HE frame are included. While the present example shows duplication of the HE-SIGB field, it is contemplated that similar principles could be applied to other preamble fields.

Figure 2:
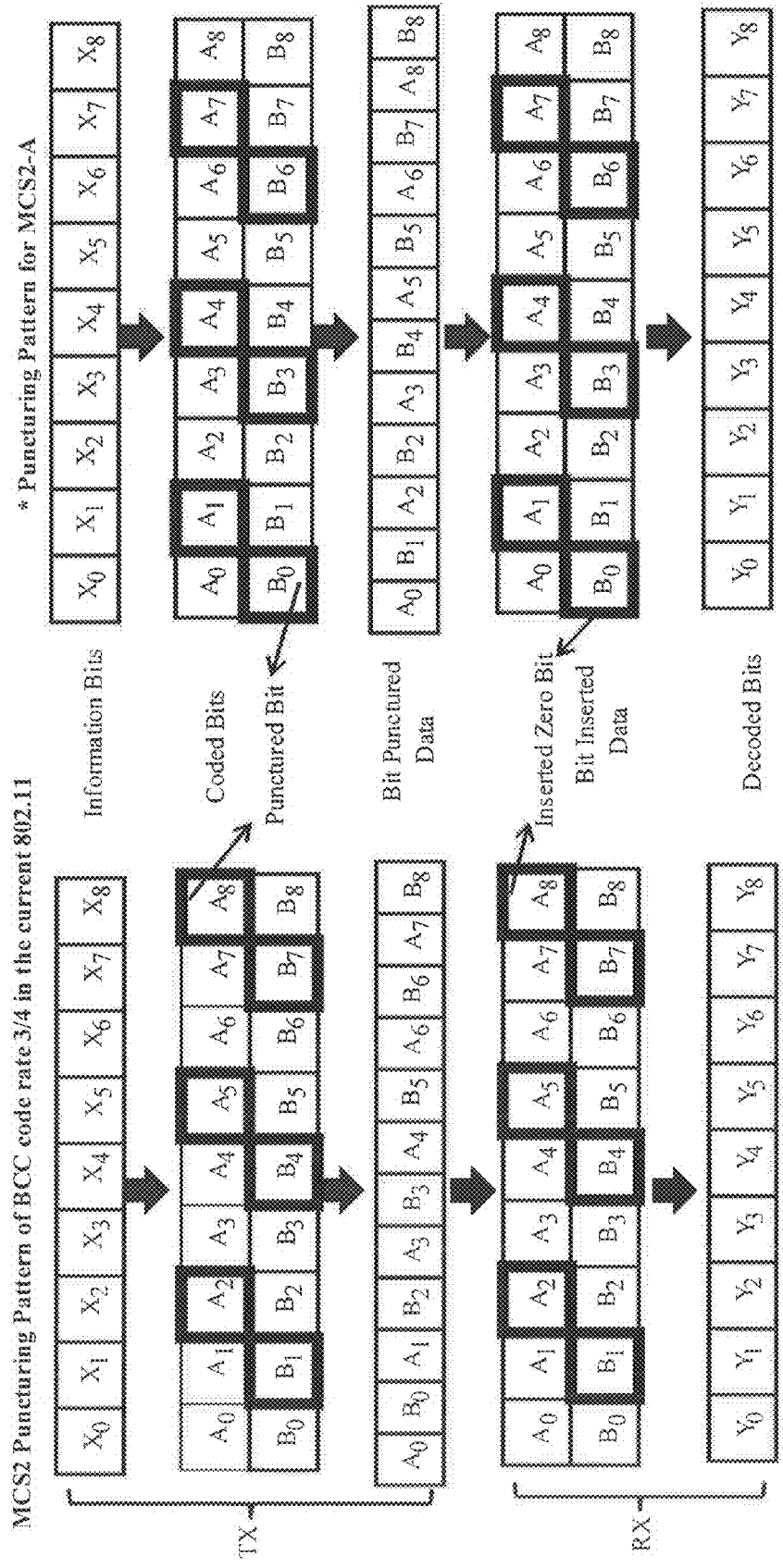
FIG. 2 illustrates Transmission and Receiving steps for an existing puncturing pattern for an MCS2 encoded SIGB frame on the left, as contrasted with a proposed different puncturing pattern MCS2-A for a duplicated SIGB frame, according to an embodiment.
Figure 3:
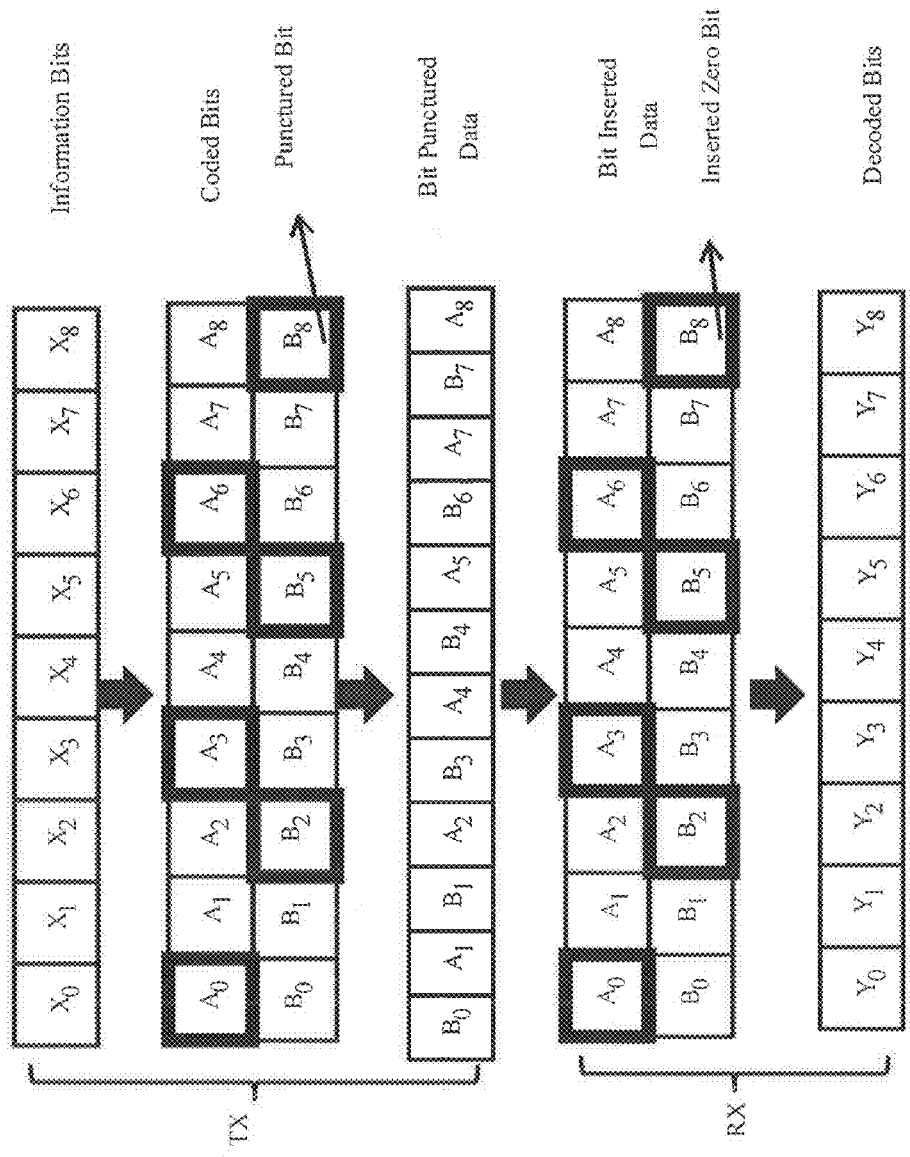
FIG. 3 illustrates Transmission and Receiving steps for a proposed different puncturing pattern MCS2-B for a duplicated SIGB frame, according to an embodiment.

FIG. 2 illustrates Transmission and Receiving steps for an existing puncturing pattern for an MCS2 encoded SIGB frame on the left, as contrasted with a proposed second puncturing pattern MCS2-A for a duplicated SIGB frame, according to an embodiment. The information bits, which for this example are the bits for the HE-SIGB frame, undergo BCC coding. The 9 information bits ($X_0$-$X_8$) are expanded to become 18 coded bits ($A_0$-$A_8$ and $B_0$-$B_8$). Every $3^{rd}$ coded bit is punctured, starting with $A_2$, such that $A_2$, $A_5$, $A_8$, $B_1$, $B_4$ and $B_7$ are removed, as per the 802.11 MCS2 scheme, such that only the bit punctured data is transmitted.

A receiver, using the known puncturing pattern, inserts zero bits to replace the punctured bits, and uses the reverse BCC decoding to generate the decoded bits $Y_0$-$Y_8$, which will be equal to $X_0$-$X_8$ ignoring any bit errors. Different puncturing patters are used for the duplicated preambles such that duplicated frames have different bits punctured, to provide redundancy to increase likelihood of correct decoding at the receiver.

More specifically, at the receiver, the following steps are executed by a controller of the receiver (after channel estimation, so that Maximum Ratio Combining (MRC) can be used):
(1) compute the Log Likelihood Ratio (LLR) of SIGB per each 20 MHz band
(2) insert the zero bit at the punctured positions according to the Puncturing pattern designated to each 20 MHz band
(3) add all the zero-bit-inserted LLRs of each 20 MHz band over the entire band and take the average
(4) input the outcomes of step (3) into the Viterbi decoder The same steps are applied for each HE-SIGB field. The only difference is the puncturing pattern, with the puncturing pattern for MCS2-A shown in the right of FIG. 2 and the puncturing pattern for MCS2-B shown in FIG. 3. As can be seen, every $3^{rd}$ bit is punctured, but the first bit to be punctured is different. More specifically the first bit to be punctured is offset by one for MCS2-A (From $A_2$ for to $A_1$) and then offset by a further one for MCS2-B (from $A_1$ to $A_0$), such that the puncturing does not remove the same bits in all of the duplications of the HE-SIGB field. As can be seen the first, second and third puncturing patterns are periodic, in that every $3^{rd}$ bit is punctured for each. Other periodic puncturing patterns can be used for other encoding rates, provided the receiver knows the pattern to insert the zero bits for the punctured bits.

Figure 4:
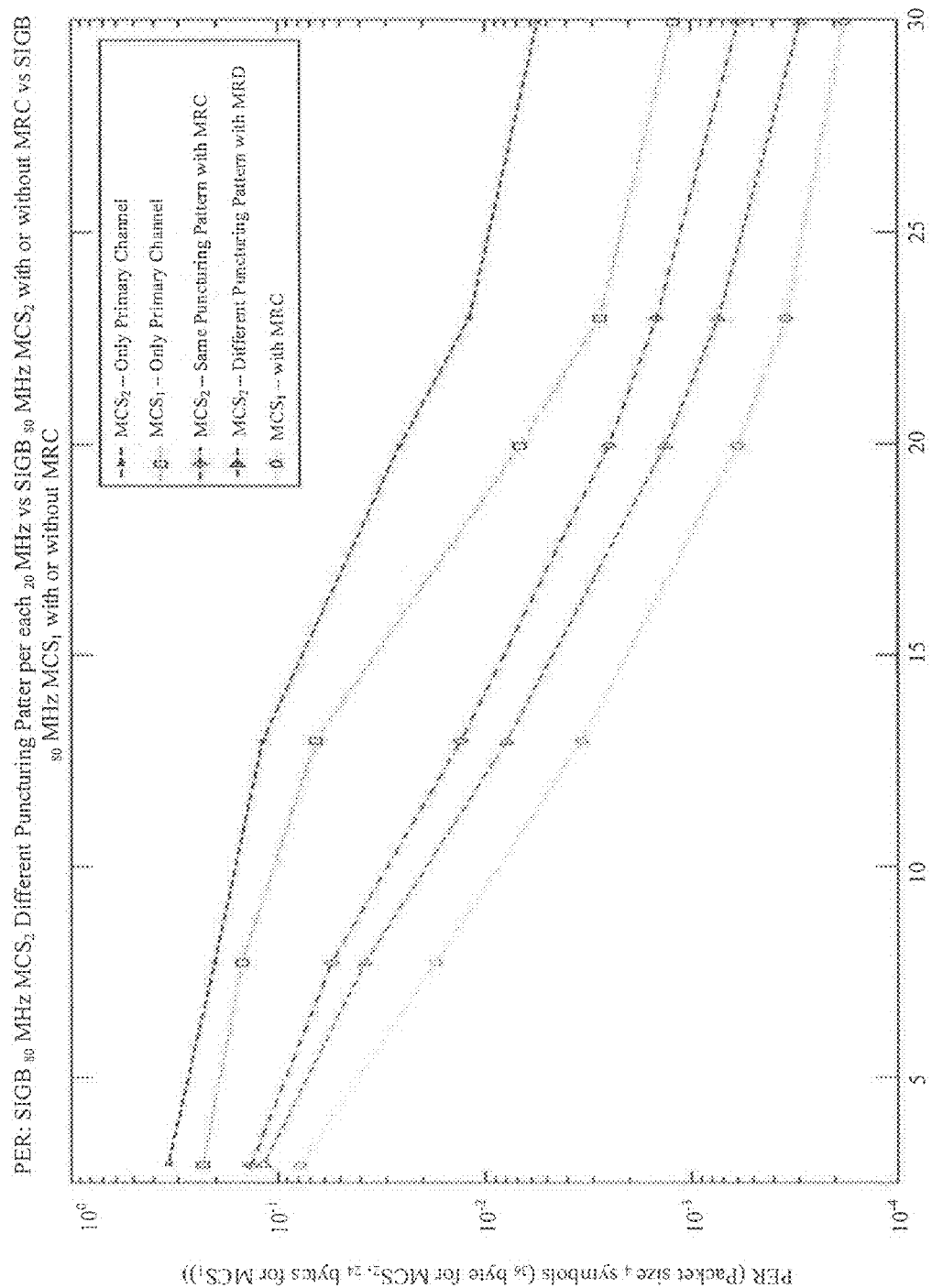
FIG. 4 illustrates graphical packet error rate (PER) comparison simulation results for the frame structure of FIG. 1.

Simulation results are illustrated in FIG. 4 for the embodiment of FIG. 1, which indicate a 2 dB gain with the MCS2 having the different puncturing patterns as contrasted with simply duplicating the SIGB with the same puncturing pattern. The detailed simulation environments are given below, and the simulation results are shown in FIG. 4. The PER performance of duplicated 80 MHz transmission for SIGB is examined. The MCS2 with the different puncturing patterns on each 20 MHz band shows about 2 dB gain at the 1% PER against the MCS2 with the same puncturing pattern, and the PER of MCS2 with the different puncturing patterns is only 2 dB worse than MCS1 with MRC. The different puncturing patterns provide more diversity gains in addition to the MRC gain, when the MRC is applied in the duplicated multi-band transmission.

Simulation Environment for the simulation shown in FIG. 4 is:
SISO 80 MHz
64 FFT/20 MHz—1× Symbol
QPSK with rate 3/4—MCS 2 with different puncturing pattern applied to each 20 MHz vs. QPSK with rate 1/2—MCS 1
Actual channel estimation
Phase noise, CFO and Timing synch compensation, ideal BCC and Viterbi decoder
ITU UMi—NLOS, 0.8 usec CP
For PER, Packet size—4 Symbols (36 bytes for MCS2, 24 bytes for MCS1))

The approach of using different puncturing patterns for different duplications of the HE-SIGB field can apply to other high rate MCSs, including existing and new code rates. Higher MCS coding rates may introduce carrying more information bits in each HE-SIGB symbol, and end up either reducing the total length of the SIGB or permit more information to be carried in SIGB.

It is envisioned that additional HE-SIG fields may be needed to provide more information for more advanced features and throughput. Accordingly, embodiments include HE-SIGB data divided into HE-SIGB common fields (for data common to each set of preambles duplicated from a common primary field) and HE-SIGB dedicated fields, which are different for each field. The HE-SIGB common field includes common information to all the OFDMA scheduled user stations (STAs). The HE-SIGB dedicated field includes user-specific information for each OFDMA scheduled STA.

FIG. 5 illustrates a frame according to an embodiment including two duplicated 40 MHz preamble portions for an 80 MHz transmission, with a different puncturing pattern in each 40 MHz duplication. In FIG. 5, the payload 590 (which includes the HE-Preamble) occupies an 80 MHz frequency band. A first preamble portion occupies a first 40 MHz frequency band (40 MHz Band 1) which includes a first 20 MHz band and a second 20 MHz band, labeled as 20 MHz bands 1 and 2, each having L-Preamble fields 510 and HE-SIGA field 520. In this embodiment, frequency domain duplication comprises frequency domain duplication of the first 40 MHz portion to form the second preamble portion which occupies a second 40 MHz frequency (40 MHz Band 2) and having a third and fourth band each occupying 20 MHz and labeled as 20 MHz bands 3 and 4. Accordingly 20 MHz band 3 is a duplication of 20 MHz band 1. Similarly 20 MHz band 4 is a duplication of 20 MHz band 2. In some embodiments, the L-Preamble and HE-SIGA fields in band 1 are duplicated over bands 2, 3, and 4. In some embodiments the 40 MHz band is split into two 20 MHz bands to allow the HE-SIG B field to differ in each 20 MHz band of the 40 MHz band, labeled as the HE-SIG-B fields a and b. Accordingly HE-SIGB common—a field 530 is same as HE-SIGB common—a field 534 except field 530 is punctured using the first puncturing pattern MCS2 and field 534 is punctured using the second puncturing pattern MCS2-A, as shown with the different hashings. Similarly HE-SIGB dedicated—a field 540 is same as HE-SIGB dedicated—a field 544 except field 540 is punctured using the first puncturing pattern MCS2 and field 544 is punctured using the second puncturing pattern MCS2-A, as shown with the different hashings. Accordingly HE-SIGB common—a field 532 is same as HE-SIGB common—a field 536 except field 532 is punctured using the first puncturing pattern MCS2 and field 536 is punctured using the second puncturing pattern MCS2-A, as shown with the different hashings. Similarly HE-SIGB dedicated—a field 542 is same as HE-SIGB dedicated—a field 546 except field 542 is punctured using the first puncturing pattern MCS2 and field 546 is punctured using the second puncturing pattern MCS2-A, as shown with the different hashings.

For the frame of FIG. 5 the following steps are executed by a controller of the receiver (after channel estimation, so that Maximum Ratio Combining (MRC) can be used):

(1) compute the Log Likelihood Ratio (LLR) of SIGB per each 20 MHz band;
(2) insert the zero bit at the punctured positions according to the Puncturing pattern designated to each 20 MHz band;
(3) add all the zero-bit-inserted LLRs of each 40 MHz band over the 80 MHz entire band and take the average;
(4) input the outcomes of step (3) into the Viterbi decoder FIG. 6 illustrates a frame according to another embodiment including two duplicated 40 MHz preamble portions for an 80 MHz transmission, with different puncturing patterns used in the 20 MHz sub-bands. More specifically, in FIG. 5, the payload 690 (which includes the HE preamble) occupies an 80 MHz frequency band. A first preamble portion occupies a first 40 MHz frequency band (40 MHz Band 1) which include first and second bands each occupying a 20 MHz frequency band, labeled as 20 MHz bands 1 and 2. In this embodiment, frequency domain duplication comprises frequency domain duplication of the first 40 MHz portion to form the second preamble portion which occupies a second 40 MHz frequency (40 MHz Band 2) and having third and fourth bands each occupying 20 MHz and labeled as 20 MHz bands 3 and 4. Accordingly 20 MHz band 3 is a duplication of 20 MHz band 1, each having L-Preamble fields 610 and HE-SIGA field 620. Similarly 20 MHz band 4 is a duplication of 20 MHz band 2, each having L-Preamble fields 611 and HE-SIGA field 622. In some embodiments the L-Preamble fields 610 and 611 are identical and duplicated from a common L,-Preamble field, as is the case with HE-SIGA fields 620 and 622. The HE-SIG B field differ in each 20 MHz band of the 40 MHz band, labeled as the HE-SIG-B fields a and b. However, unlike in FIG. 5, the HE-SIG common fields are all the same in FIG. 6. Specifically, the HE-SIG B common field is the same in each duplication (i.e., in each 20 MHz band, but with differing puncturing patters, as will be discussed below) but the HE-SIGB dedicated field differs between the 20 MHz bands within each 40 MHz band. Accordingly HE-SIGB common—field 630 is same as HE-SIGB common—fields 632, 634, 636 except for the puncturing patterns used. Specifically field 630 is punctured using the first puncturing pattern MCS2 and field 632 is punctured using the second puncturing pattern MCS3-A and field 634 is punctured using third puncturing pattern MCS2-B, as shown with the different hashings. As there are only 3 puncturing patterns, field 636 is punctured using one of the 3 puncturing patterns, which in this case is MCS2. Accordingly, the common HE-SIGB fields use differing puncturing patterns with the differing 20 MHz bands.

However HE-SIGB dedicated—a field 640 is same as HE-SIGB dedicated—a field 644 except field 640 is punctured using the first puncturing pattern MCS2 and field 644 is punctured using the second puncturing pattern MCS2-A, as shown with the different hashings. Similarly HE-SIGB dedicated—a field 642 is same as HE-SIGB dedicated—a field 646 except field 642 is punctured using the first puncturing pattern MCS2 and field 646 is punctured using the second puncturing pattern MCS2-A, as shown with the different hashings. Accordingly, in the embodiment illustrated in FIG. 6, the dedicated HE-SIGB fields use differing puncturing patterns with the differing 40 MHz bands, but use the same puncturing pattern with the two 20 MHz bands within each 40 MHz band.

Figure 7:
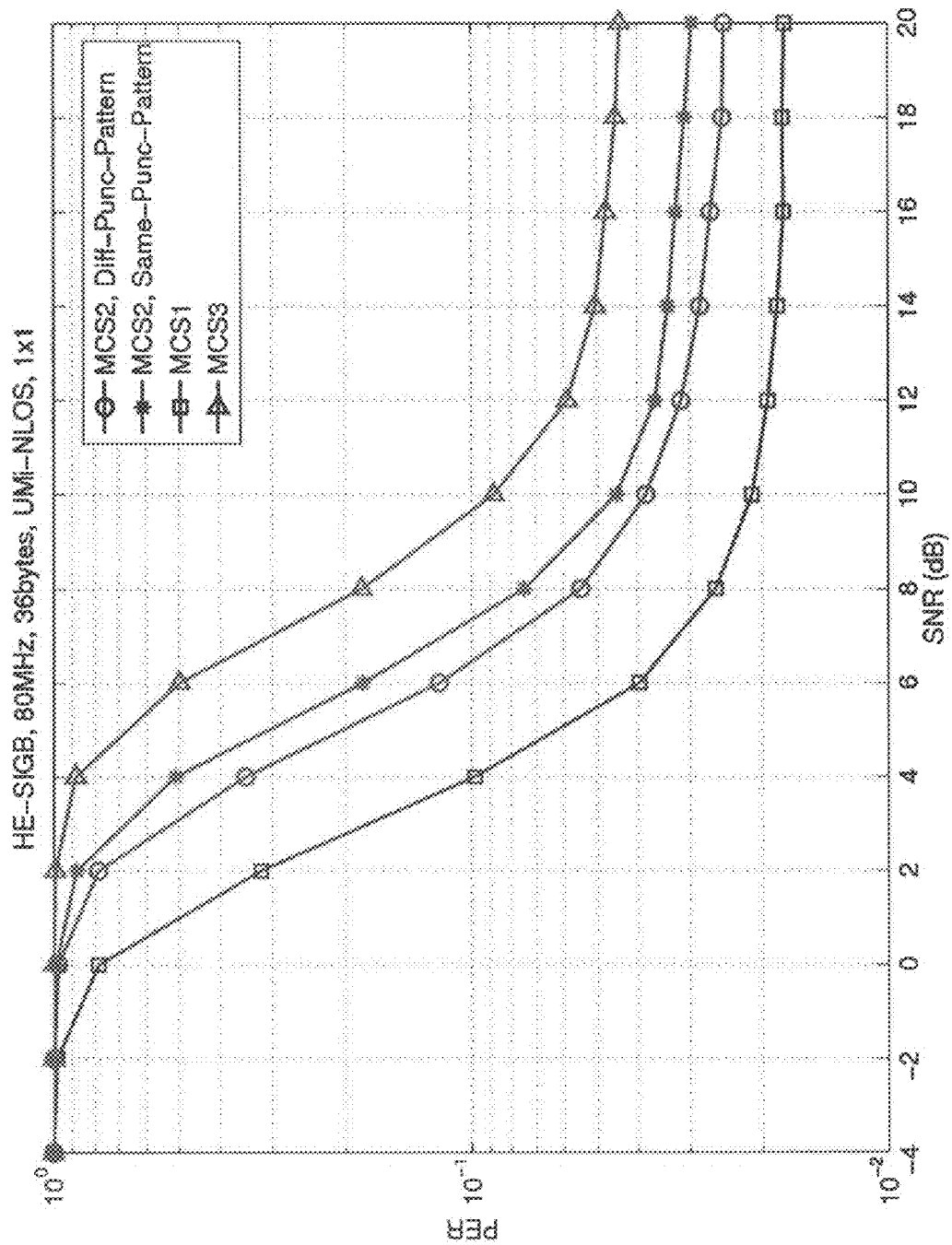
FIG. 7 illustrates graphical packet error rate (PER) comparison simulation results for the frame structure of FIG. 5.

For the frame of FIG. 6 the following steps are executed by a controller of the receiver (after channel estimation, so that Maximum Ratio Combining (MRC) can be used):

(1) compute the Log Likelihood Ratio (LLR) of SIGB per each 20 MHz band
(2) insert the zero bit at the punctured positions according to the Puncturing pattern designated to each 20 MHz band
(3) add all the zero-bit-inserted LLRs of each 20 MHz band over the entire 80 MHz band and take the average
(4) input the outcomes of step (3) into the Viterbi decoder FIG. 7 illustrates graphical packet error rate (PER) comparison simulation results for the frame structure of FIG. 5. Simulation Environment for the simulation shown in FIG. 7 is:

SISO 80 MHz w/40 MHz duplication
Primary 20 and the secondary 20 MHz are separately encoded in the primary 40 MHz
64 FFT/20 MHz—1× Symbol
QPSK with rate 3/4—MCS 2 with different puncturing pattern applied to each 40 MHz vs. MCS 1, MCS2 and MCS3
Actual channel estimation
Phase noise, CFO and Timing synch compensation, ideal BCC and Viterbi decoder
ITU UMi—NLOS, 0.8 usec CP
For PER, Packet size—36 bytes.

Figure 8:
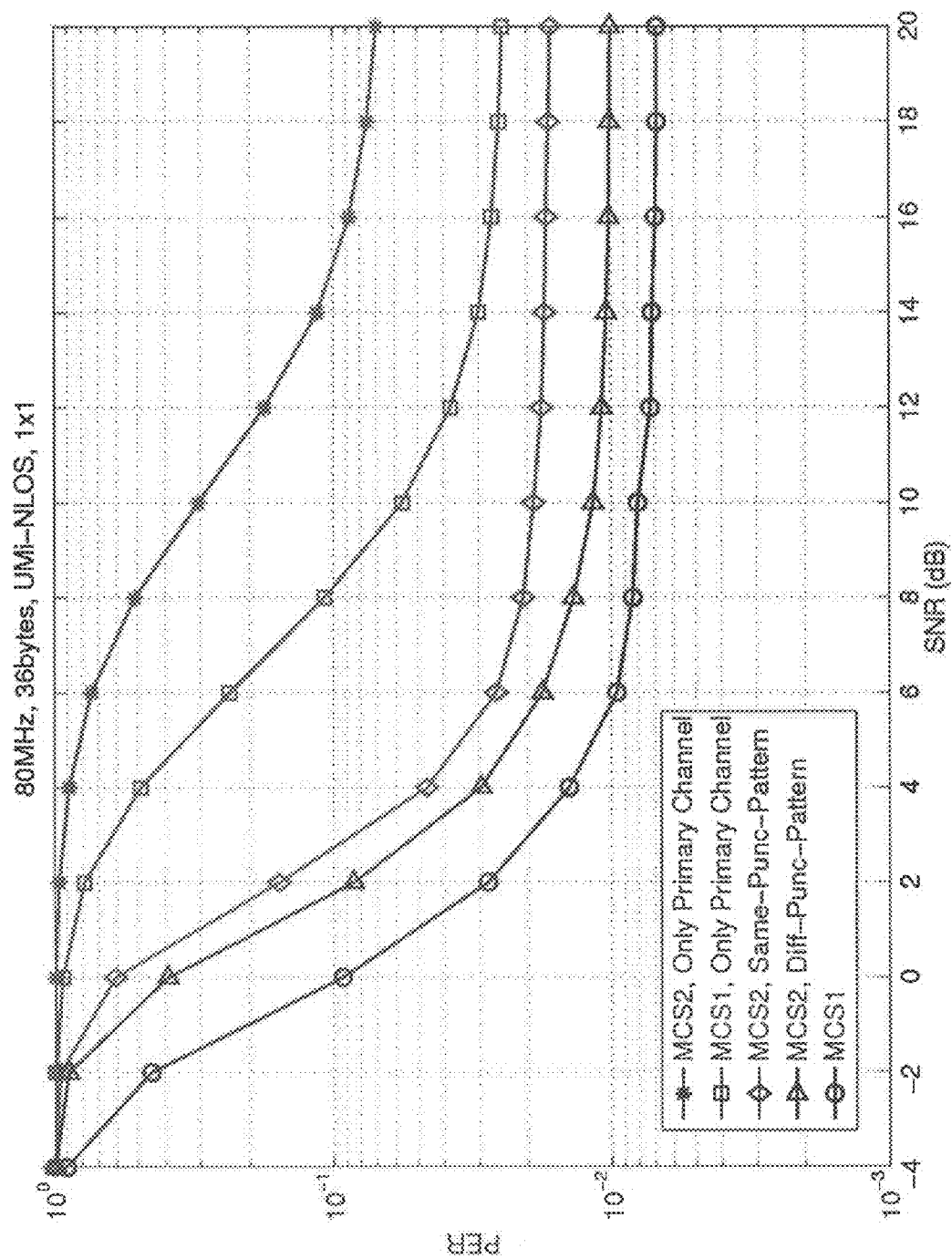
FIG. 8 illustrates graphical packet error rate (PER) comparison simulation results for the frame structure of FIG. 6.

FIG. 8 illustrates graphical packet error rate (PER) comparison simulation results for the frame structure of FIG. 6. Simulation Environment for the simulation shown in FIG. 8 is:

SISO 80 MHz w/20 MHz duplication
Each 20 MHz is separately encoded in the 80 MHz transmission
64 FFT/20 MHz—1× Symbol
QPSK with rate 3/4—MCS 2 with different puncturing pattern applied to each 20 MHz vs. MCS 1 and MCS2 w/wo combining
Actual channel estimation
Phase noise, CFO and Timing synch compensation, ideal BCC and Viterbi decoder
ITU UMi—NLOS, 0.8 usec CP
For PER, Packet size—36 bytes.

Figure 9:
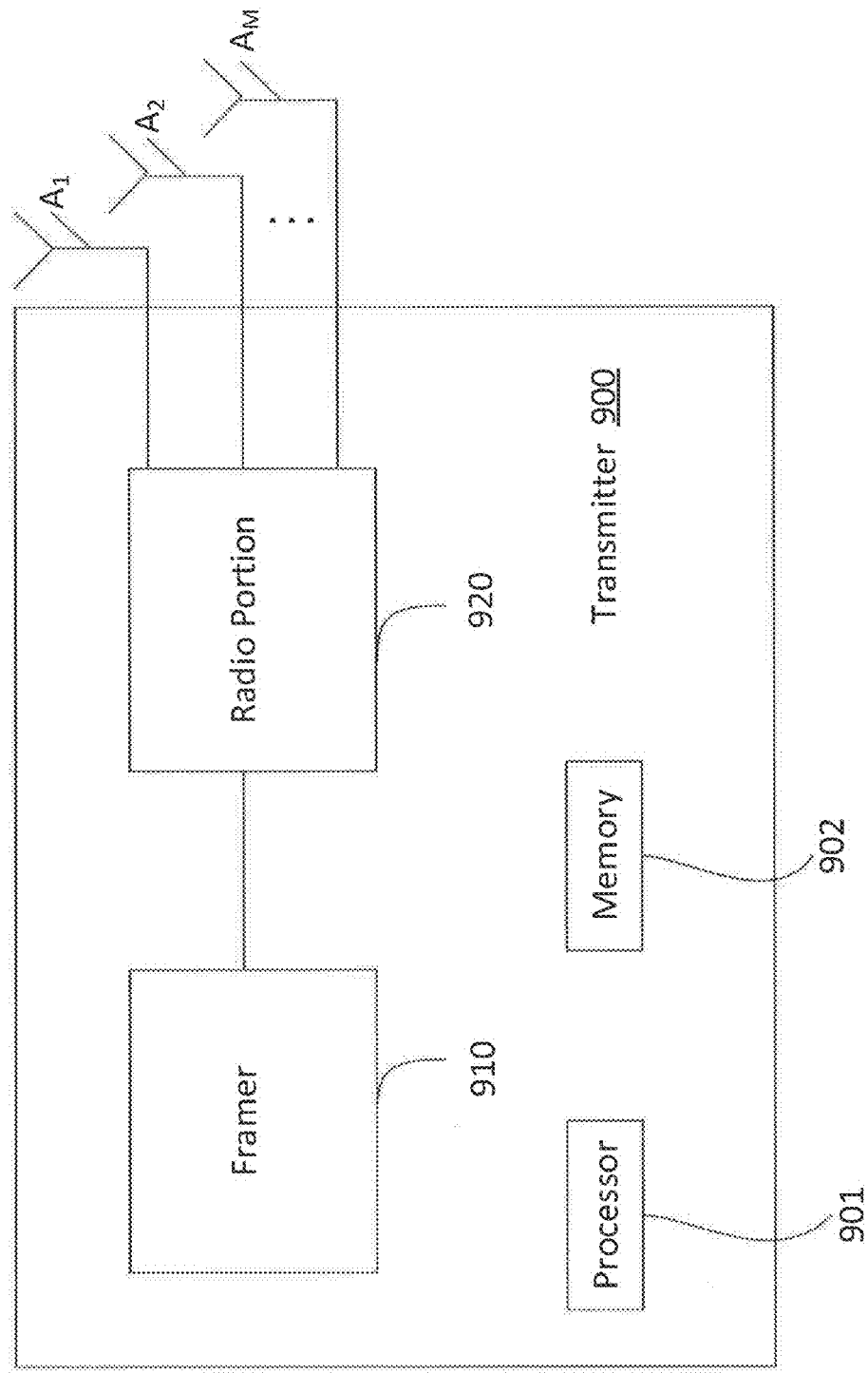
FIG. 9 is a block diagram of a transmitter according to an embodiment.

FIG. 9 is block diagram of a transmitter according to an embodiment. Such a transmitter may form part of an Access Point (AP) or other wireless device. FIG. 9 includes a transmitter 900 coupled to M transmit antennas $A_1, A_2 \ldots A_M$. The transmitter includes a framer 910 for producing frame preamble data for a packet (or frame) as discussed herein. For example, the framer 910 produces a frame with a preamble which is frequency domain duplicated to provide a plurality of sub-bands each having a preamble, and includes an HE-SIGB field in each sub-band. Framer 910 can include a frequency domain duplicator for duplicating of at least a portion of a frame to form a first preamble portion at a first frequency and a second preamble portion at a second frequency. The framer can also include an encoder for encoding and puncturing at least one preamble field of the first preamble portion with a first puncturing pattern, and for encoding and puncturing at least one preamble field of the second preamble portion with a second puncturing pattern. The duplicator can duplicate 40 MHz preambles which include two 20 MHZ preambles to produce two 40 MI-z preambles each of which include two 20 MHZ preambles. The encoder can encode the HE-SIGB fields of each of these preambles, using two or more puncturing patters, as discussed herein. The transmitter 900 also includes a radio portion 920 for transmitting the frame on the M transmit antennas $A_1, A_2 \ldots A_M$, and may include an STBC encoder for mapping said N streams onto the M antennas for transmission. The framer 910 and STBC encoder 920 may be implemented by one or more processors 901 and associated memory 902. The processors may include FPGAs, ASICs, general purpose micro-processors or the like. It should be appreciated that there are other components of the transmitter circuitry which are not germane to the present disclosure, and are therefore not shown.

Figure 10:
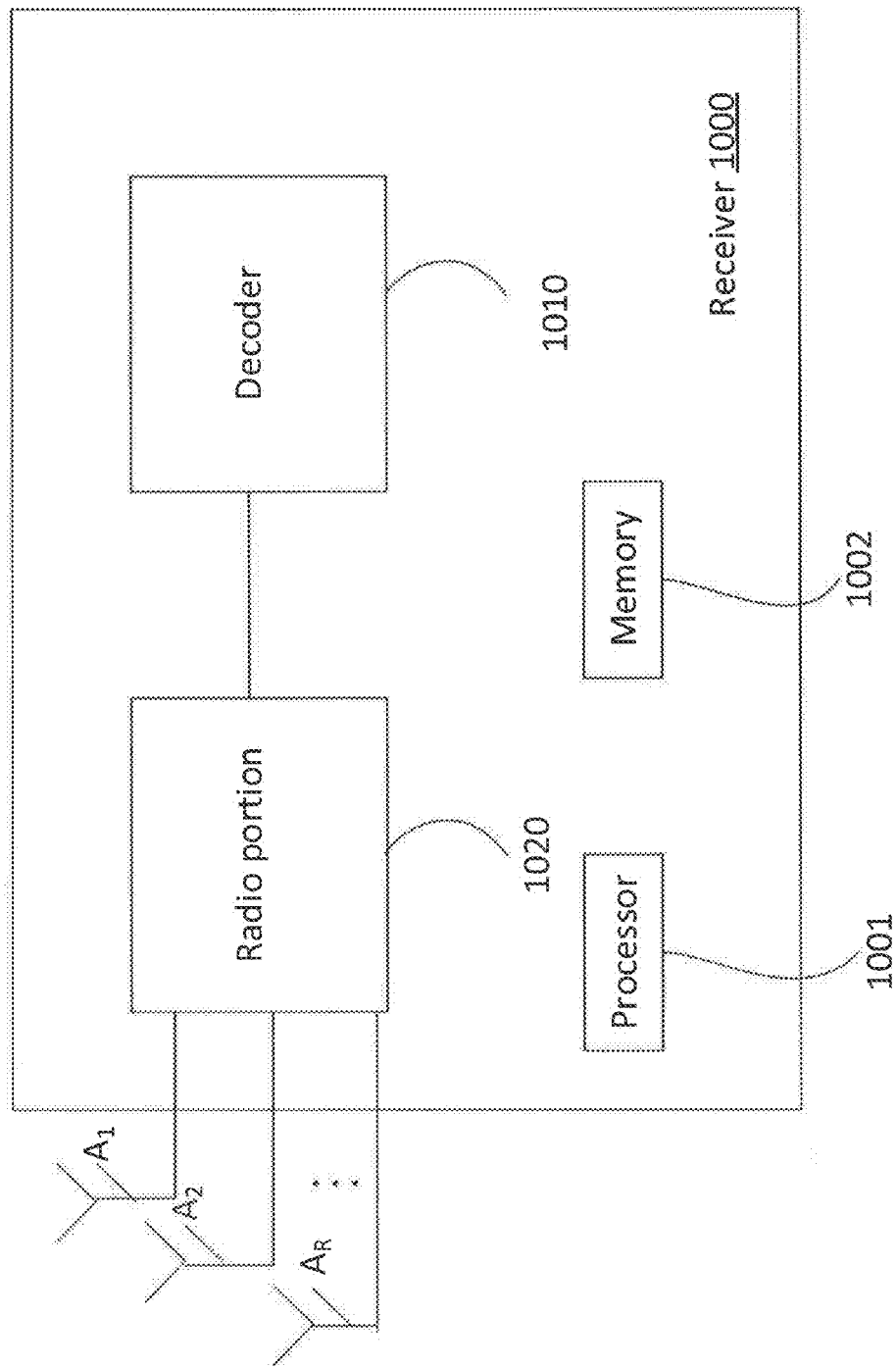
FIG. 10 is block diagram of a receiver according to an embodiment.

FIG. 10 is block diagram of a receiver having R receive antennas $A_1, A_2 \ldots A_R$, according to an embodiment. Such a receiver may form part of an access point or other wireless device, such as a user station (STA). The receiver includes a radio unit 1020 for receiving one or more transmitted space-time block code (STBC) encoded streams on the R receive antennas. The radio unit for receives a wireless frame including a first preamble portion at a first frequency and a second preamble portion at a second frequency each preamble portion including at least one field of bit punctured BCC (Bitwise Convolutional Code) encoded data. The receiver includes a decoders 1010 for inserting zero bit data into each of the received bit punctured fields according to a first puncturing pattern for the first preamble portion and a second puncturing pattern for the second preamble portion prior to conducting BCC decoding of each received punctured field. The receiver can receive duplicated 40 MHz preambles each of which include two 20 MHZ preambles. The decoder 1010 can decode the HE-SIGB fields of each of these preambles, using two or more puncturing patters, as discussed herein.

The radio unit 1010 and decoder 1020 may be implemented by one or more processors 1001 and associated memory 1002. The processors may include FPGAs, ASICs, general purpose micro-processors or the like. It should be appreciated that there are other components of the receiver circuitry which are not germane to the present disclosure, and are therefore not shown.

FIG. 11 is a flowchart illustrating a communication method, accord to an embodiment. The communication method includes puncturing at least one field of a first portion of a frame at a first frequency with a first puncturing pattern 1110. The communication method further includes puncturing at least one field of a second portion of the frame at a second frequency with a second puncturing pattern 1120 and transmitting the frame 1130.

Embodiments may be implemented in WLAN systems and devices, such as APs, STAs, processor chips, and machine readable mediums for storing machine readable instructions for causing a processor to execute the methods described and claimed herein, and the like.

Although embodiments of the invention have been described and illustrated in detail, it is to be clearly understood that the same is by way of illustration and example only and not to be taken by way of limitation, the scope of the present invention being limited only by the appended claims.

The invention claimed is:

1. A communication method comprising:
   frequency domain duplication of at least a portion of the preamble information of a frame to form a first portion at a first frequency and a second portion at a second frequency;
   puncturing at least one field of the first portion of the frame at the first frequency with the first puncturing pattern;
   puncturing at least one field of the second portion of the frame at the second frequency with the second puncturing pattern; and
   transmitting the frame.

2. The communication method as claimed in claim 1 in which the frame includes a preamble and a payload, wherein:
   frequency domain duplication comprises frequency domain duplication of a preamble portion to form a first preamble portion at the first frequency and a second preamble portion at the second frequency.

3. The communication method as claimed in claim 2 wherein:
   puncturing at least one field of a first portion comprises puncturing at least one field of the first preamble portion with the first puncturing pattern; and puncturing at least one field of a second portion comprises puncturing at least one field of the second preamble portion with the second puncturing pattern.

4. The communication method as claimed in claim 3 wherein the first puncturing pattern and the second puncturing pattern offset which bits are punctured by one bit.

5. The communication method as claimed in claim 4 wherein:
the payload occupies an 80 MHz frequency band;
the first preamble portion occupies a first 40 MHz frequency band and comprises first and second bands each occupying a 20 MHz frequency band and each comprising preamble fields;
frequency domain duplication comprises frequency domain duplication of the first preamble portion to form the second preamble portion which occupies a second 40 MHz frequency and having third and fourth bands each occupying 20 MHz and each comprising preamble fields;
puncturing at least one field of a first portion comprises puncturing at least one field of each of the first and second bands with the first puncturing pattern;
puncturing at least one field of a second portion comprises puncturing at least one field of each of the third and fourth bands with the second puncturing pattern.

6. The communication method as claimed in claim 5, wherein:
each 20 MHz band includes preamble fields which are in common and are not punctured, a common field which requires puncturing and a dedicated field which requires puncturing;
puncturing at least one field of a first portion comprises puncturing the dedicated field of each of the first and second bands with the first puncturing pattern;
puncturing at least one field of a second portion comprises puncturing the dedicated field of each of the third and fourth bands with the second puncturing pattern.

7. The communication method as claimed in claim 6 further comprising:
puncturing the common field which includes:
puncturing of the first 20 MHz band with the first puncturing pattern;
puncturing of the second 20 MHz band with the second puncturing pattern; and
puncturing of the third 20 MHz band with a third puncturing pattern.

8. The communication method as claimed in claim 7 wherein the preamble fields to be punctured are BCC (Bitwise Convolutional Code) encoded using a 3/4 rate with puncturing to form bit punctured fields and further comprising puncturing the common field which requires puncturing of the fourth band with a puncturing pattern selected from one of the first, second and third puncturing patterns.

9. The communication method as claimed in claim 8 wherein:
each of the first, second and third puncturing patterns comprise puncturing every $3^{rd}$ BCC encoded bit;
the second puncturing pattern offsetting the first bit to be punctured by one bit from a first bit punctured by the first puncturing pattern; and
the third puncturing pattern offsetting the first bit to be punctured by two bits from the first bit punctured by the first puncturing pattern.

10. The communication method as claimed in claim 9 wherein the frame is an IEEE 802.11 frame, the common field is an HE-SIGB common field, the dedicated field is a HE-SIGB dedicated field, and the first puncturing pattern is an MCS2 puncturing pattern.

11. The communication method as claimed in claim 2 wherein frequency domain duplication further comprises frequency domain duplication of the preamble portion to form a third preamble portion at a third frequency and a fourth preamble portion at a fourth frequency;
and further comprising:
puncturing at least one field of a third preamble portion with a third puncturing pattern; and
puncturing at least one field of a fourth preamble portion with a puncturing pattern selected from one of the first, second and third puncturing patterns.

12. The communication method as claimed in claim 11 wherein:
each preamble includes at least one legacy field, a High Efficiency (HE)-SIGA field and at least one HE-SIGB field, and the at least one field of each preamble portion which is punctured comprises the at least one HE-SIGB field;
the payload occupies 80 MHz and the preamble portion occupies 20 MHz, such that said frame includes the payload, a 20 MHz preamble, and 3 duplicate 20 MHz preamble portions each including the same at least one legacy field and the HE-SIGA field; and
the HE-SIGB fields are BCC (Bitwise Convolutional Code) encoded using a 3/4 rate with puncturing to form bit HE-SIGB fields.

13. The communication method as claimed in claim 12 wherein:
each of the first, second and third puncturing patterns comprise puncturing every $3^{rd}$ BCC encoded bit;
the second puncturing pattern offsetting the first bit to be punctured by one bit from a first bit punctured by the first puncturing pattern; and
the third puncturing pattern offsetting the first bit to be punctured by two bits from the first bit punctured by the first puncturing pattern.

14. A communication method as claimed in claim 13, wherein a receiver which receives the transmitted frame inserts zero bit data into each of the received bit punctured HE-SIGB fields according to the puncturing pattern used to puncture each HE-SIGB field prior to the receiver conducting BCC decoding of each received HE-SIGB field.

15. The communication method as claimed in claim 2 wherein puncturing at least one field of a second portion of the frame comprises puncturing at least one field corresponding to the at least one field punctured with the first puncturing pattern.

16. A transmitter for transmitting a wireless frame comprising:
a framer for producing a frame including a preamble data; and
a radio unit for transmitting the frame;
the framer including:
a frequency domain duplicator for duplicating of at least a portion of a frame to form a first preamble portion at a first frequency and a second preamble portion at a second frequency;
an encoder for
encoding and puncturing at least one preamble field of the first preamble portion with a first puncturing pattern; and
encoding and puncturing at least one preamble field of the second preamble portion with a second puncturing pattern.

17. The transmitter as claimed in claim 16 further comprising a processor and machine readable memory including executable instructions for implementing said framer.

18. A receiver comprising:
   a radio unit for receiving a wireless frame including a first preamble portion at a first frequency and a second preamble portion at a second frequency each preamble portion including at least one field of bit punctured BCC (Bitwise Convolutional Code) encoded data;
   a decoder for inserting zero bit data into each of the received bit punctured fields according to a first puncturing pattern for the first preamble portion and a second puncturing pattern for the second preamble portion prior to conducting BCC decoding of each received punctured field.

19. The receiver as claimed in claim 18 further comprising a processor and machine readable memory including executable instructions for implementing said decoder.

\* \* \* \* \*

UNITED STATES PATENT AND TRADEMARK OFFICE
CERTIFICATE OF CORRECTION

PATENT NO. : 9,992,000 B2
APPLICATION NO. : 15/010717
DATED : June 5, 2018
INVENTOR(S) : Jung Hoon Suh et al.

It is certified that error appears in the above-identified patent and that said Letters Patent is hereby corrected as shown below:

In the Specification

Column 7, Line 38, "-a field" should read -- -b field--

Column 7, Line 39, "-a field" should read -- -b field--

Column 7, Line 43, "-a field" should read -- -b field--

Column 7, Line 44, "-a field" should read -- -b field--

Column 8, Line 41, "dedicated -a field" should read --dedicated -b field-- AND "dedicated -a" should read --dedicated -b field--

Signed and Sealed this
Twenty-third Day of October, 2018

Andrei Iancu
*Director of the United States Patent and Trademark Office*